United States Patent
Wang et al.

(10) Patent No.: US 12,141,654 B2
(45) Date of Patent: Nov. 12, 2024

(54) CODE SCANNING METHOD AND APPARATUS

(71) Applicant: HUAWEI TECHNOLOGIES CO., LTD., Guangdong (CN)

(72) Inventors: Qingwen Wang, Shanghai (CN); Zhenyang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/325,837

(22) Filed: May 30, 2023

(65) Prior Publication Data
US 2023/0325619 A1    Oct. 12, 2023

Related U.S. Application Data

(63) Continuation of application No. PCT/CN2020/132645, filed on Nov. 30, 2020.

(51) Int. Cl.
G06K 7/14    (2006.01)

(52) U.S. Cl.
CPC ......... G06K 7/1417 (2013.01); G06K 7/1413 (2013.01)

(58) Field of Classification Search
CPC .. G06K 7/1417; G06K 7/1413; G06K 7/1465; G06K 7/10722; G06K 7/1443; G06K 7/1439; H04N 23/61; H04N 23/80
See application file for complete search history.

(56) References Cited

U.S. PATENT DOCUMENTS

2014/0297058 A1* 10/2014 Barker ............... G07C 5/008
                                                                 701/1
2021/0103712 A1*  4/2021 He .................... G06K 7/1465

FOREIGN PATENT DOCUMENTS

| CN | 105551145 A | 5/2016 |
| CN | 106919610 A | 7/2017 |
| CN | 106980971 A | 7/2017 |
| CN | 108763999 A | 11/2018 |
| CN | 110147695 A | 8/2019 |
| CN | 210402444 U | 4/2020 |
| CN | 111222867 A | 6/2020 |
| CN | 210667732 U | 6/2020 |

OTHER PUBLICATIONS

Xiaopeng Motors, "Xiaopeng Motors and Alipay jointly developed the "in-car payment" function, which was first implemented on Xiaopeng P7," Nov. 26, 2019, retrieved from URL: <https://www.xiaopeng.com/news/company_news/3355.html>, 10 pages (with English translation).

Extended European Search Report in European Appln No. 20962995.5, dated Jan. 26, 2024, 6 pages.

* cited by examiner

*Primary Examiner* — Jamara A Franklin
(74) *Attorney, Agent, or Firm* — Fish & Richardson P.C.

(57) ABSTRACT

The present disclosure relates to code scanning methods based on vehicle-mounted cameras. One example method includes collecting a first image by using a vehicle-mounted camera, parsing a target encoding pattern included in the first image, and when no parsing information is obtained, collecting, based on image data obtained by the vehicle-mounted camera, another image that is close to the first image in a time relationship for parsing to attempt to obtain parsing information in the target encoding pattern.

27 Claims, 6 Drawing Sheets

CODE SCANNING METHOD AND APPARATUS

CROSS-REFERENCE TO RELATED APPLICATION

This application is a continuation of International Application No. PCT/CN2020/132645, filed on Nov. 30, 2020, the disclosure of which is hereby incorporated by reference in its entirety.

TECHNICAL FIELD

The present invention relates to the field of intelligent cockpits, and in particular, to a vehicle code scanning method and an apparatus.

BACKGROUND

Code scanning is a non-contact interaction manner. In this interaction manner, one party provides an encoding pattern including specific information, and the other party uses an optical recognition device to scan the encoding pattern that includes specific information and that is provided by the former, obtains a specific instruction through network communication, and performs a corresponding operation, so as to complete a code scanning interaction process.

In driving scenarios, there are many code scanning interaction operations. Currently, in a driving-related code scanning interaction scenario, an intelligent terminal device, for example, a mobile phone is mainly used as an optical recognition device to collect and parse specific information in a target encoding pattern. However, the intelligent terminal device, for example, the mobile phone usually needs to be unlocked and a corresponding application needs to be opened for code scanning, which is cumbersome and time-consuming, distracts a driver, and is likely to cause traffic jams. If a vehicle is in a special road condition, for example, a ramp, performing code scanning by using the intelligent terminal device such as the mobile phone may be likely to distract driver's attention, resulting in safety hazards such as slipping.

SUMMARY

Embodiments of the present invention provide a code scanning method based on a vehicle-mounted camera, a control apparatus, and a computer-readable medium, to resolve problems that complex operations take a long time, distract a driver, and easily cause traffic jams because an intelligent terminal device, for example, a mobile phone, usually needs to be unlocked and a corresponding application needs to be opened for code scanning in a driving scenario; and to improve code scanning efficiency and driving safety in the driving scenario.

A first aspect of embodiments of the present invention provides a code scanning method, including:
  obtaining a first image collected by a vehicle-mounted camera, where the first image includes a photographed target encoding pattern;
  parsing the target encoding pattern; and
  when no parsing information is obtained by parsing the target encoding pattern, parsing the target encoding pattern by using a second image, where the second image is an image collected by the vehicle-mounted camera, and an interval between a collection moment of the second image and a collection moment of the first image is within a first preset time period, where that a first image collected by a vehicle-mounted camera includes a photographed target encoding pattern means that the photographed target encoding pattern exists in the first image, but no photographed target encoding pattern that can be parsed exists. Herein, "that can be parsed" means that information corresponding to a two-dimensional code can be obtained through parsing from the pattern. Because of a fast driving state of a vehicle and an angle of the camera, the photographed target encoding pattern included in the first image may have problems such as incompleteness, low definition, or distortion. Therefore, an original target encoding pattern may not be clearly and completely photographed. As a result, the photographed target encoding pattern included in the first image collected by the vehicle-mounted camera may not be necessarily parsed. Therefore, when parsing is performed on the first image that includes the photographed target encoding pattern, a parsing failure occurs due to problems such as incompleteness, low definition, and serious distortion that are of the target encoding pattern in the first image.

The parsing the target encoding pattern by using a second image may be:
  parsing a target encoding image in one second image each time, and continuing to parse a next second image when no parsing information is obtained; or
  when an operation condition permits, simultaneously parsing target encoding images in a plurality of second images.

In a driving scenario, especially in a driving process of a vehicle, it is difficult to collect, at a time, a target encoding image that can be parsed. Therefore, a problem of missing detection is easily caused. In this embodiment of the present invention, as long as the first image collected by the vehicle-mounted camera includes the target encoding pattern, the target encoding pattern enters a parsing phase regardless of whether the target encoding pattern is complete or can be parsed, and operations such as integrity check and alignment may be performed on the target encoding pattern in the parsing phase, to reduce a missing detection rate.

Before and after a moment approaching a moment at which it is detected that the first image obtained by the vehicle-mounted camera includes the target encoding pattern, the vehicle-mounted camera may collect an image that includes the target encoding pattern that can be parsed. Therefore, when no parsing information is obtained by parsing the target encoding pattern in the first image obtained by the vehicle-mounted camera, the target encoding pattern continues to be parsed by using the second image that is obtained by the vehicle-mounted camera and whose interval between the collection moment and the collection moment of the first image is within the first preset time period, so that a success rate of parsing the target encoding pattern can be improved.

With reference to the first aspect, in a first possible implementation of the first aspect, the parsing the target encoding pattern by using a second image may be:
  performing sampling on image data based on a second preset time interval to obtain one second image, where an interval between a moment at which the image data is collected and the moment at which the vehicle-mounted camera collects the first image is within the first preset time period;

parsing the target encoding pattern by using the second image; and when no parsing information is obtained by parsing the target encoding pattern in the second image, performing next sampling on the image data based on the second preset time interval, where the interval between the moment at which the image data is collected and the moment at which the vehicle-mounted camera collects the first image is within the first preset time period.

A closer moment at which the first image obtained by the vehicle-mounted camera is detected to include the target encoding pattern indicates a higher probability that the vehicle-mounted camera collects an image that includes the target encoding pattern that can be parsed. Therefore, when sampling is performed on the image data, sampling may be performed starting from the collection moment of the first image to a moment before the moment, or sampling may be performed starting from the collection moment of the first image to a moment after the moment, or sampling may be performed from the collection moment of the first image to a moment alternately before and after the moment. When an operation condition permits, sampling may also be performed from the collection moment of the first image to moments before and after the moment. In the foregoing parsing manner of the second image, parsing efficiency can be improved, and a time period of a code scanning operation can be shortened.

With reference to the first aspect, in a second possible implementation of the first aspect, the parsing the target encoding pattern by using a second image may be:

performing sampling on image data based on a second preset time interval to obtain a plurality of second images, where an interval between a moment at which the image data is collected and the moment at which the vehicle-mounted camera collects the first image is within the first preset time period;

sorting the plurality of second images based on exposure or definition;

parsing the target encoding pattern in the second images according to a sorting order; and stopping parsing the target encoding pattern when the parsing information is obtained.

The parsing the target encoding pattern in the second images according to a sorting order may be parsing the target encoding pattern in one second image each time. Alternatively, when an operation condition permits, the target encoding pattern may be simultaneously parsed in the plurality of second images.

The plurality of second images are sorted, and the target encoding patterns in the second images are parsed according to a sorting order, so that an image with a good imaging effect can be preferably parsed, thereby improving parsing efficiency and shortening a time period of a code scanning operation.

With reference to any one of the first aspect or the foregoing two possible implementations of the first aspect, in a third possible implementation of the first aspect, when parsing information is obtained by parsing the target encoding pattern in the second image, a corresponding operation is performed according to an indication in the parsing information. The parsing information refers to valid target information carried in the target encoding pattern, and is usually a link pointing to some content or an interface.

With reference to any one of the first aspect or the foregoing three possible implementations of the first aspect, in a fourth possible implementation of the first aspect, when no parsing information is obtained by parsing the target encoding pattern in the second image, after a vehicle status changes, the target encoding pattern is parsed by using a third image obtained by the vehicle-mounted camera.

With reference to the fourth possible implementation of the first aspect, in a fifth possible implementation of the first aspect, changing the vehicle status may be: prompting a driver to adjust the vehicle status or automatically adjusting the vehicle status by the vehicle.

With reference to the fourth possible implementation of the first aspect or the fifth possible implementation of the first aspect, in a sixth possible implementation of the first aspect, the vehicle status may be one or more of a position, a speed, or an orientation of the vehicle, and a shooting angle of the vehicle-mounted camera.

If no parsing information is obtained by parsing the target encoding pattern in the second image, it indicates that imaging effects of the target encoding pattern in the first image and the target encoding pattern in the second image are not very good. As a result, it is difficult to parse the target encoding pattern in the first image and the target encoding pattern in the second image. In this case, adaptive adjustment is performed on the vehicle status, for example, the position, the speed, or the orientation of the vehicle, and the shooting angle of the vehicle-mounted camera, to improve an imaging effect of the target encoding pattern, and improve a parsing success rate. Changing the vehicle status may be prompting a driver to adjust the vehicle status. Alternatively, for a vehicle with a specific automatic driving function, the vehicle may automatically adjust the vehicle status on a premise that there is no potential safety hazard, to reduce distraction to a driver's attention and improve driving safety.

With reference to the fourth possible implementation of the first aspect, the fifth possible implementation of the first aspect, or the sixth possible implementation of the first aspect, in a seventh possible implementation of the first aspect, a time period or a quantity of times of parsing the target encoding pattern by using the third image collected by the vehicle-mounted camera may be limited. For example, a time threshold or a quantity threshold is set. When the time period or the quantity of times of parsing the target encoding pattern by using the third image collected by the vehicle-mounted camera reaches the threshold, a failure is directly returned.

When no stop condition is set, before the parsing information is successfully obtained, the state of the vehicle may be continuously changed, and the third image is continuously collected for parsing. In this process, a large amount of time may be wasted. Even in some extreme cases, the target encoding pattern in the third image cannot be successfully parsed regardless of whether the vehicle status is adjusted. Therefore, the time period or the quantity of times of parsing the third image collected by the vehicle-mounted camera is limited to some extent, so that when the parsing time period is long, a parsing operation can be stopped in time, and the driver is prompted to perform interaction in another manner, thereby improving efficiency and saving time.

With reference to any one of the first aspect or the foregoing seven possible implementations of the first aspect, in an eighth possible implementation of the first aspect, the parsing the target encoding pattern includes:

detecting integrity of the target encoding pattern;

aligning the target encoding pattern when it is detected that the target encoding pattern is complete; and parsing the target encoding pattern.

With reference to the eighth possible implementation of the first aspect, in a ninth possible implementation of the first aspect, the detecting integrity of the target encoding pattern may be detecting integrity of the target encoding pattern based on a positioning icon in the target encoding pattern, or detecting integrity of the target encoding pattern based on a position of the target encoding pattern.

With reference to the eighth possible implementation of the first aspect, in a tenth possible implementation of the first aspect, the aligning the target encoding pattern includes: aligning the target encoding pattern based on the positioning icon in the target encoding pattern.

In the first aspect of embodiments of the present invention, as long as the first image obtained by the vehicle-mounted camera includes the target encoding pattern, the target encoding pattern enters a parsing phase regardless of whether the target encoding pattern is complete or can be parsed. If the target encoding pattern is incomplete or has serious distortion, parsing information cannot be obtained. Therefore, in the parsing phase, integrity of the target encoding pattern is first detected. If the target encoding pattern is incomplete, the image is discarded, and a next image is parsed. The target encoding pattern is aligned when it is detected that the target encoding pattern is complete. If the target encoding pattern is seriously distorted and therefore cannot be aligned, the image is discarded, and a next image is parsed. By using two steps of integrity detection and alignment, the target encoding pattern that cannot be parsed can be eliminated in advance, thereby improving parsing efficiency and shortening a time period of a code scanning operation. In addition, the alignment step can further improve a success rate of parsing the target encoding pattern, and reduce a missing detection rate.

With reference to the third possible implementation of the first aspect, in an eleventh possible implementation of the first aspect, security verification may be further performed before a corresponding operation is performed.

In a process of continuously collecting images by the vehicle-mounted camera, some irrelevant encoding pattern information that does not conform to a driver's willingness may be collected and parsed, and even some encoding patterns that include malicious information may be collected and parsed. Therefore, security verification is performed before a corresponding operation is performed according to the instruction in the parsing information, so that security can be greatly improved.

The security verification may be confirming a willingness to perform a corresponding operation, for example, confirming the willingness to perform the corresponding operation in one or more manners of a voice response, a head unit operation, a gesture response, and a head posture response. In some cases, an identity of an operator may be further confirmed. For example, the identity of the operator may be confirmed in one or more manners of facial recognition, iris recognition, fingerprint recognition, or voice recognition.

In the man-machine interaction manners of the voice response, the head unit operation, the gesture response, and the head posture response, a driver's willingness or a passenger's willingness to perform the corresponding operation can be confirmed, and a to-be-executed operation is recognized by the driver or a passenger, thereby greatly improving safety. The man-machine interaction manners of the voice response, the head unit operation, the gesture response, and the head posture response are simple to operate, and can reduce distraction of a driver's attention and improve driving safety. In addition, when some operations with a high security level are performed, for example, payment of a large amount, in addition to confirming the willingness to pay, an identity of an operator may be further confirmed, to further improve security.

With reference to any one of the first aspect or the foregoing eleven possible implementations of the first aspect, in a twelfth possible implementation of the first aspect, the target encoding pattern may be a two-dimensional code or a one-dimensional bar code.

With reference to any one of the first aspect or the foregoing twelve possible implementations of the first aspect, in a thirteenth possible implementation of the first aspect, that a first image collected by a vehicle-mounted camera includes a target encoding pattern may be that the first image collected by the vehicle-mounted camera includes an encoding pattern having a specific geometric feature, and the specific geometric feature is a feature that distinguishes the target encoding pattern from another encoding pattern.

With reference to the thirteenth possible implementation of the first aspect, in a fourteenth possible implementation of the first aspect, the geometric feature includes one or more of a border, a shading, a background color, and an aspect ratio.

In an actual application scenario, it may be desirable to detect and parse some of the encoding patterns that include specific information without being interfered by other encoding patterns. Some geometric features may be added to the target encoding pattern that needs to be identified, to distinguish the target encoding pattern from another encoding pattern, thereby reducing a probability of detecting and parsing an incorrect encoding pattern, and reducing interference of an irrelevant encoding pattern.

With reference to any one of the first aspect or the foregoing fourteen possible implementations of the first aspect, in a fifteenth possible implementation of the first aspect, the obtaining a first image collected by a vehicle-mounted camera may be: obtaining, when a trigger condition is met, the first image collected by the vehicle-mounted camera.

With reference to the fifteenth possible implementation of the first aspect, in a sixteenth possible implementation of the first aspect, the trigger condition includes one or more of the following: an instruction of an operator is received, a vehicle speed is lower than a threshold, a specific geographical location is reached, and an instruction sent through a network is received.

In an actual application scenario, there may be a large amount of encoding pattern information. If the target encoding pattern in the image collected by the vehicle-mounted camera is continuously collected and parsed, specific interference may be caused to normal driving of the driver. In addition, collecting and parsing target encoding information when a user does not expect it may cause some misoperations. By setting the trigger condition, the operator can enable the collection function of the target encoding pattern when the operator needs to perform a code scanning operation, so that interference of an irrelevant encoding pattern is reduced, a probability of a misoperation of the vehicle is reduced, interference to normal driving of the driver is reduced, and safety is improved.

A second aspect of embodiments of the present invention provides a vehicle-mounted apparatus, including:
  a processor and a memory, where the processor and the memory are coupled, the memory stores program instructions, and when the program instructions stored in the memory are executed by the processor, the code scanning method according to any one of the first aspect or the foregoing sixteen possible implementations of the first aspect is implemented.

The vehicle-mounted apparatus provided in the second aspect of embodiments of the present invention may be installed in a vehicle in any form, including a front-mounted vehicle-mounted product and a rear-mounted vehicle-mounted product.

With reference to the second aspect of embodiments of the present invention, in a first possible implementation of the second aspect of embodiments of the present invention, the vehicle-mounted apparatus may be integrated inside a vehicle-mounted camera, and the vehicle-mounted camera implements the code scanning method according to any one of the first aspect or the foregoing sixteen possible implementations of the first aspect. In addition, parsing information obtained by parsing a target encoding pattern is transferred to a central control system, and all the foregoing beneficial effects are achieved.

With reference to the second aspect of embodiments of the present invention, in a second possible implementation of the second aspect of embodiments of the present invention, the vehicle-mounted apparatus may be integrated into a central control system of a vehicle, and the central control system obtains an image collected by the vehicle-mounted camera, to implement the code scanning method according to any one of the first aspect or the foregoing sixteen possible implementations of the first aspect, and achieve all the foregoing beneficial effects.

A third aspect of embodiments of the present invention provides another vehicle-mounted apparatus, including:
  a vehicle-mounted camera, configured to collect an image; and
  a processor and a memory, where the processor and the memory are coupled, the memory stores program instructions, and when the program instructions stored in the memory are executed by the processor, the code scanning method according to any one of the first aspect or the foregoing sixteen possible implementations of the first aspect is implemented.

The vehicle-mounted apparatus provided in the third aspect of embodiments of the present invention may be installed in a vehicle in any form, including a front-mounted vehicle-mounted product and a rear-mounted vehicle-mounted product.

The vehicle-mounted apparatus provided in the third aspect of embodiments of the present invention integrates a vehicle-mounted camera, a memory, and a processor, and can be integrated to complete steps of collecting, detecting, and parsing a target encoding pattern, to implement the code scanning method according to any one of the first aspect or the foregoing sixteen possible implementations of the first aspect, and achieve all of the foregoing beneficial effects.

A fourth aspect of embodiments of the present invention provides a vehicle, including:
  a vehicle-mounted camera, configured to collect an image;
  a display module, configured to display content corresponding to parsing information obtained by parsing a target encoding pattern;
  an input module, configured to receive an input of an operator; and
  a processor and a memory, where the processor and the memory are coupled, the memory stores program instructions, and when the program instructions stored in the memory are executed by the processor, the code scanning method according to any one of the first aspect or the foregoing sixteen possible implementations of the first aspect is implemented.

The fourth aspect of embodiments of the present invention provides a vehicle, including a vehicle-mounted camera, a memory, a processor, a display module, and an input module. After a target encoding pattern is collected and detected, and parsing information is successfully obtained, the code scanning method according to any one of the first aspect or the foregoing sixteen possible implementations of the first aspect is implemented. On this basis, the display module displays content corresponding to the parsing information obtained by parsing the target encoding pattern, and the input module receives an input of an operator, so that an interaction process with the operator after a code scanning operation can be implemented, and the parsing information obtained by parsing the target encoding pattern can be processed in time. Efficiency of the scanning operation is improved, and all the foregoing beneficial effects are achieved.

A fifth aspect of embodiments of the present invention provides a computer-readable medium, where the computer-readable medium includes a program, and when the program is run on a computer, the computer is enabled to implement the code scanning method according to any one of the first aspect or the foregoing fifteen possible implementations of the first aspect.

BRIEF DESCRIPTION OF DRAWINGS

To describe the technical solutions in embodiments of the present invention more clearly, the following briefly describes the accompanying drawings for describing embodiments and the conventional technology.

DESCRIPTION OF EMBODIMENTS

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

An intelligent terminal device, for example, a mobile phone, is used as an optical recognition device. In an operation of collecting and parsing an encoding pattern, a position and an angle of the intelligent terminal usually need to be adjusted, so that the encoding pattern in the collected image is straight, has a proper size, and is centered. In this way, information in the encoding pattern can be successfully parsed. However, in a driving-related scenario, a vehicle is usually in a driving state, and it is difficult for a vehicle-mounted camera to collect an encoding pattern that meets a parsing condition at a time. After the image that includes the encoding pattern and that is collected by the vehicle-mounted camera fails to be parsed, when a collection operation is performed again, the vehicle may have missed an optimal position for collecting the encoding pattern. As a result, a code scanning interaction process fails. In this embodiment of the present invention, to solve a problem that it is difficult to collect and parse an encoding pattern in a driving scenario, and it is difficult to successfully parse the encoding pattern at a time, a code scanning method that is more suitable for the driving scenario and the vehicle-mounted camera is proposed.

Figure 1:
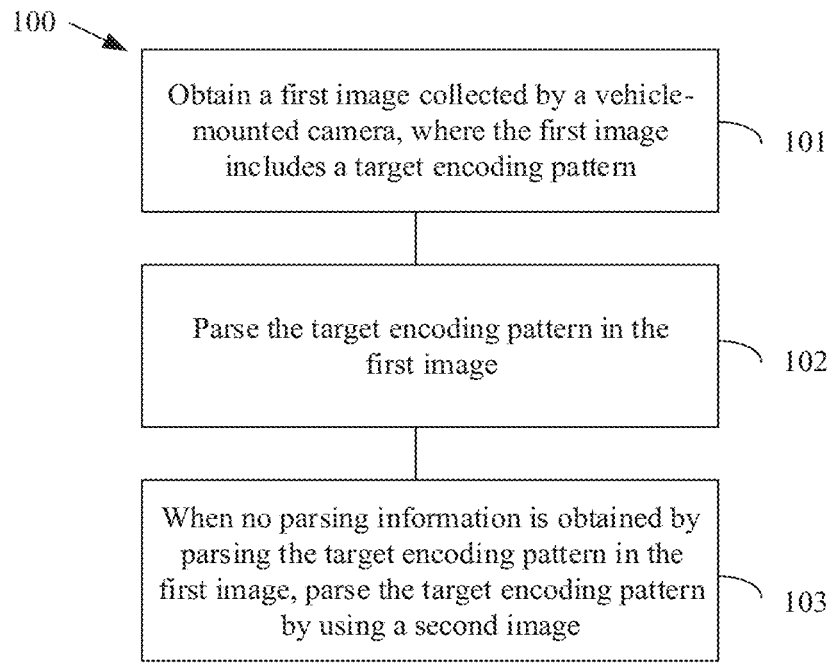
FIG. 1 is a schematic diagram of a code scanning method according to an embodiment of the present invention.

Refer to FIG. 1. In an embodiment of the present invention, a code scanning method 100 is provided. The method includes the following steps:

Step 101: Obtain a first image collected by a vehicle-mounted camera, where the first image includes a photographed target encoding pattern.

Step 102: Parse the target encoding pattern.

Step 103: When no parsing information is obtained by parsing the target encoding pattern in the first image, parse the target encoding pattern by using a second image.

At present, most vehicles are equipped with vehicle-mounted camera apparatuses to monitor environments outside the vehicles. For example, an around view monitor (AVM, Around View Monitor) usually arranges a wide-angle or fisheye camera at the front, rear, left, and right of the vehicle to obtain a 360° surround view effect through combination. In step 101 of this embodiment of the present invention, the first image collected by the vehicle-mounted camera is obtained. In an implementation, the vehicle-mounted camera may reuse an existing camera that performs another function and that is at a proper position. For example, cameras on two sides may be used to collect images located on the two sides of the vehicle, or a camera in the front of the vehicle may be used to collect an image located in front of the vehicle. The reused vehicle-mounted camera may determine an enabling moment of a collection function based on an original function, provided that it is ensured that the vehicle-mounted camera is in an enabled state when a code scanning operation needs to be performed. This is not limited in this embodiment of the present invention. For example, the collection function of the vehicle-mounted camera may be automatically enabled after a vehicle control system is enabled, or may be enabled after driver authorization. In another implementation, a dedicated camera dedicated to the code scanning operation of the vehicle may also be installed at a proper position. A collection function of the dedicated camera may be automatically enabled after the vehicle control system is enabled, or may be enabled through some trigger conditions when the code scanning operation is required. The following describes the trigger conditions of the collection function of the dedicated camera in detail.

An image collected by the vehicle-mounted camera is usually distorted. In an implementation, to facilitate detection and parsing of the target encoding pattern in the image obtained by the vehicle-mounted camera, distortion correction may be performed on the image collected by the vehicle-mounted camera. Specifically, according to an algorithm integrated by the vehicle-mounted camera, distortion correction may be performed while the image is collected, and an image on which distortion correction is performed is directly obtained. Alternatively, a processor may perform distortion correction on the obtained image collected by the vehicle-mounted camera, to obtain an image on which distortion correction is performed. A manner of performing distortion correction on the image collected by the vehicle-mounted camera is not limited in this embodiment of the present invention.

Figure 2A:
FIG. 2A is a two-dimensional code pattern according to an embodiment of the present invention.
Figure 2B:
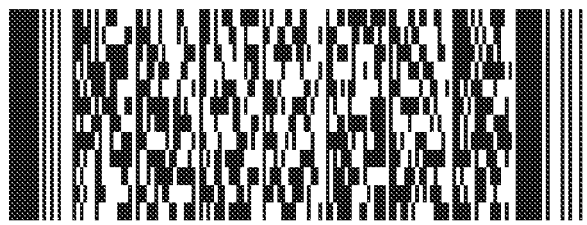
FIG. 2B is a two-dimensional bar code pattern according to an embodiment of the present invention.
Figure 2C:
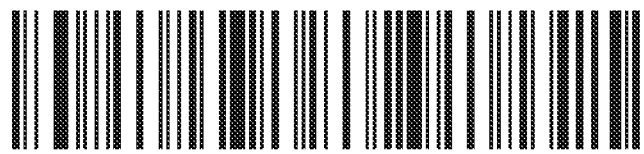
FIG. 2C is a one-dimensional bar code pattern according to an embodiment of the present invention.

The target encoding pattern in this method embodiment is an encoding pattern that includes specific information and expects to be collected and parsed in a code scanning interaction process. In some embodiments, the target encoding pattern may be a two-dimensional code pattern (for example, a QR code) shown in FIG. 2A. In some other embodiments, the target encoding pattern may be a two-dimensional bar code pattern shown in FIG. 2B (for example, PDF417). In some other embodiments, the target encoding pattern may alternatively be a one-dimensional bar code pattern shown in FIG. 2C (for example, Code128).

That the first image collected by the vehicle-mounted camera includes a photographed target encoding pattern means that the photographed target encoding pattern exists in the first image, but a photographed target encoding pattern that can be parsed does not exist. Herein, "that can be parsed" means that information corresponding to a two-dimensional code can be obtained through parsing from the pattern. Because of a fast driving state of a vehicle and an angle of the camera, the photographed target encoding pattern included in the first image may have problems such as incompleteness, low definition, or distortion. Consequently, an original target encoding pattern may not be clearly and completely photographed. As a result, the photographed target encoding pattern included in the first image collected by the vehicle-mounted camera may not be necessarily parsed. Therefore, when the first image that includes the photographed target encoding pattern is parsed, a parsing failure occurs due to problems such as incompleteness, low definition, and serious distortion of the target encoding pattern in the first image.

To obtain the first image that is collected by the vehicle-mounted camera and that includes the photographed target encoding pattern, the image collected by the vehicle-mounted camera needs to be detected, to be specific, whether the image collected by the vehicle-mounted camera includes the target encoding pattern is detected. Most of existing encoding pattern detection algorithms are based on rules, and the algorithms require an encoding pattern to be straight, to have a proper size, and to be centered. For a vehicle, especially a driving vehicle, it is difficult to directly collect an encoding image that meets the foregoing requirements. Therefore, it is not proper to use the algorithms directly. To overcome the foregoing difficulties, in an implementation, a pattern recognition algorithm may be used to detect the target encoding pattern in the first image obtained by the vehicle-mounted camera. In other words, detection of the target encoding pattern is considered as a target detection task, and samples including the target encoding pattern are collected and labeled to train algorithms such as a deep neural network, a support vector machine, and template matching. To improve robustness of a target detection algorithm and reduce a missing detection rate, some incomplete target encoding patterns and seriously distorted target encoding patterns may be added when the target detection algorithm is trained. A trained algorithm can detect whether the target encoding pattern exists in the image collected by the vehicle-mounted camera, and can also detect existence of the target encoding pattern when the target encoding pattern is incomplete or is seriously distorted.

In an implementation, an independent target detection algorithm may be trained according to the foregoing method, and is dedicated to detection of the target encoding pattern. In another implementation, if the vehicle-mounted camera has some functions that need to perform target detection, and the functions run continuously, or running scenarios of target detection functions of the vehicle-mounted camera can cover a code scanning operation scenario, the target encoding pattern may be integrated into an existing target detection algorithm that can be used in the vehicle-mounted camera as a new type of target.

In some implementations, a function of detecting whether the image obtained by the vehicle-mounted camera includes the target encoding pattern and the collecting function of the vehicle-mounted camera may be simultaneously enabled, and continuously run. In some other implementations, when the collecting function of the vehicle-mounted camera is enabled, the detection function of the target encoding pattern may be enabled in a specific triggering manner. Details are described in the following.

In step 102 of this embodiment of the present invention, the target encoding pattern in the first image collected by the vehicle-mounted camera is parsed, to obtain parsing information in the target encoding pattern. The following describes the steps in the parsing process in detail.

In step 102 of this embodiment of the present invention, because the target encoding pattern in the first image collected by the vehicle-mounted camera may be incomplete, or may be of an excessively small size, seriously distorted, or the like, it is difficult to parse the target encoding pattern in the first image. In other words, the parsing information cannot be obtained by parsing the first image obtained by the vehicle-mounted camera. The parsing information is valid target information collected in the target encoding pattern, and is usually content or an interface obtained after some links are accessed.

In step 103 of this embodiment of the present invention, when no parsing information is obtained by parsing the target encoding pattern in the first image obtained by the vehicle-mounted camera, a second image including the target encoding pattern may be obtained, and the target encoding pattern may be parsed based on the second image. Generally, there is a highest probability that a target encoding pattern that can be parsed is collected before and after a moment at which it is detected that the image collected by the vehicle-mounted camera includes the target encoding pattern. Therefore, when no parsing information is obtained by parsing the target encoding image in the first image obtained by the vehicle-mounted camera, the target encoding pattern may be parsed by using the second image. The second image is an image that is collected by the vehicle-mounted camera at a moment, where a time interval between the moment and a collection moment of the first image is within a first preset time period.

Figure 3:
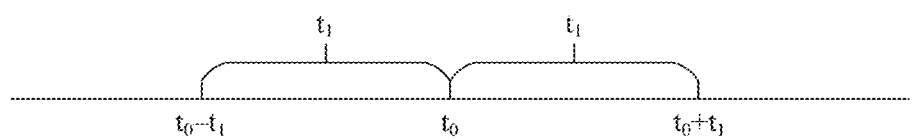
FIG. 3 is a schematic diagram of a relationship between a moment at which a second image is collected by a vehicle-mounted camera and a moment at which a first image is collected according to an embodiment of the present invention.

Refer to FIG. 3. In an implementation of the present invention, $t_0$ is a moment at which the vehicle-mounted camera collects the first image, $t_1$ is a first preset time period, and a second image may be an image collected by the vehicle-mounted camera in a time period from $t_0-t_1$ to $t_0+t_1$. In an implementation, the first preset time period may be set by a system, and different first preset time periods may be set based on different vehicle speeds. For example, the first preset time period may be set to 5 seconds when a vehicle speed is 30 km/h, the first preset time period is appropriately shortened when a vehicle speed is greater than 30 km/h, and the first preset time period is appropriately prolonged when a vehicle speed is less than 30 km/h. In another implementation, the first preset time period may be set by a user.

Figure 4A:
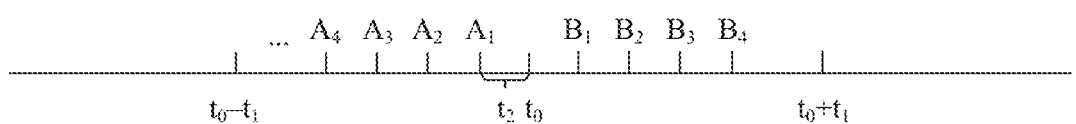
FIG. 4A shows an implementation of parsing a target encoding pattern based on a second image according to an embodiment of the present invention.

In step 103, when no parsing information is obtained by parsing the target encoding pattern in the first image, the target encoding pattern is parsed by using the second image. Refer to FIG. 4A. In an implementation, a moment $t_0$ at which a vehicle-mounted camera collects a first image is used as a start point, a second preset time period $t_2$ is a time interval, sampling is performed at a moment before $t_0$, to obtain a second image $A_1$, and a target encoding pattern in the second image $A_1$ is parsed. In an implementation, the second preset time period may be set by a system, and different second preset time periods may be set based on different vehicle speeds. For example, the second preset time period may be set to 0.1 seconds when a vehicle speed is 30 km/h, the second preset time period is appropriately shortened when a vehicle speed is greater than 30 km/h, and the second preset time period is appropriately prolonged when a vehicle speed is less than 30 km/h. In another implementation, the second preset time period may be set by the user.

If no parsing information is obtained by parsing the target encoding pattern in the second image $A_1$, sampling is performed again at the moment before to at the second preset time period $t_2$, to obtain a second image $A_2$, and the target encoding pattern in the second image $A_2$ is parsed. When no parsing information is still obtained by parsing the target encoding pattern in the second image $A_2$, sampling is continuously performed again at the moment before to at the second preset time period $t_2$, to obtain second images $A_3$, $A_4$, and the like in sequence. A parsing process is stopped once the parsing information in the target encoding pattern is successfully obtained. If no parsing information is obtained from any image obtained through sampling at the moment before the moment to, sampling is performed again at a moment after the moment to at the second preset time period $t_2$, to obtain a second image $B_1$, and a target encoding pattern in the second image $B_1$ is parsed. If no parsing information is obtained by parsing the target encoding pattern in the second image $B_1$, sampling is performed again at the moment after to at the second preset time period $t_2$, to obtain a second image $B_2$, and a target encoding pattern in the second image $B_2$ is parsed. When no parsing information is still obtained by parsing the target encoding pattern in the second image $B_2$, sampling is performed again at the moment before to at the second preset time period $t_2$, to obtain second images $B_3$, $B_4$, and the like in sequence. The parsing process is stopped once the parsing information in the target encoding pattern is successfully parsed.

It should be understood that, according to the method in this embodiment, the second image may be sampled and parsed in the foregoing order, or the second image may be sampled and parsed in another order. For example, in another implementation, an image after the moment to may be sampled and parsed first, and then an image before the moment to is sampled and parsed. In other words, sampling may be first performed at the moment after to at the second preset time period $t_2$, to obtain the second image $B_1$, and the target encoding pattern in the second image $B_1$ is parsed. If no parsing information is obtained by parsing the target encoding pattern in the second image $B_1$, sampling is performed again at the moment after to at the second preset time period $t_2$, to obtain a second image $B_2$, and a target encoding pattern in the second image $B_2$ is parsed. When no parsing information is still obtained by parsing the target encoding pattern in the second image $B_2$, sampling is performed again at the moment before to at the second preset time period $t_2$, to obtain second images $B_3$, $B_4$, and the like in sequence. The parsing process is stopped once the parsing information in the target encoding pattern is successfully parsed. If no parsing information is obtained from any image obtained through sampling at the moment after the moment to, sampling is performed again at the moment before the moment to at the second preset time period $t_2$, to obtain a second image $A_1$, and a target encoding pattern in the second image $A_1$ is parsed. If no parsing information is obtained by parsing the target encoding pattern in the second image $A_1$, sampling is performed again at the moment before to at the second preset time period $t_2$, to obtain a second image $A_2$, and the target encoding pattern in the second image $A_2$ is parsed. When no parsing information is still obtained by parsing the target encoding pattern in the second image $A_2$, sampling is continuously performed again at the moment before to at the second preset time period $t_2$, to obtain second images $A_3$, $A_4$, and the like in sequence. A parsing process is stopped once the parsing information in the target encoding pattern is successfully obtained.

In another implementation, the second image may be obtained through sampling in a left-right alternate manner, and the second image obtained through sampling is parsed. First, sampling may be performed at the moment after to at the second preset time period $t_2$, to obtain a second image $B_1$, and a target encoding pattern in the second image $B_1$ is parsed. If no parsing information is obtained by parsing the target encoding pattern in the second image $B_1$, sampling is performed at the moment before to at the second preset time period $t_2$, to obtain a second image $A_1$, and a target encoding pattern in the second image $A_1$ is parsed. If no parsing information is obtained by parsing the target encoding pattern in the second image $A_1$, sampling is performed again at the moment after to at the second preset time period $t_2$, to obtain a second image $B_2$, and a target encoding pattern in the second image $B_2$ is parsed. When no parsing information is still obtained by parsing the target encoding pattern in the second image $B_2$, sampling is continuously performed to obtain second images $A_2$, $B_3$, $A_3$, $B_4$, $A_4$, and the like in sequence, and each second image is sequentially parsed. A parsing process is stopped once the parsing information in the target encoding pattern is successfully obtained. Alternatively, sampling may be first performed at the moment before to in the foregoing left-right alternate order, to obtain second images $A_1$, $B_1$, $A_2$, $B_2$, $A_3$, $B_3$, $A_4$, $B_4$, and the like through sampling in sequence, and each second image is parsed in sequence. A parsing process is stopped once the parsing information in the target encoding pattern is successfully obtained.

In another implementation, when an operation condition permits, the moment to at which the vehicle-mounted camera collects the first image may be used as a start point, and the second image may be obtained by simultaneously sampling forward and backward, and a target encoding pattern in the second image is parsed. For example, second images $A_1$ and $B_1$ are first obtained through sampling at the second preset time period $t_2$, and target encoding patterns in the second images $A_1$ and $B_1$ are parsed. If no parsing information is obtained by parsing the target encoding patterns in the second images $A_1$ and $B_1$, sampling is performed again at the second preset time period $t_2$, to obtain the second images $A_2$ and $B_2$, and the target encoding patterns in the second images $A_2$ and $B_2$ are parsed. By analogy, the parsing process is stopped once the parsing information in the target encoding pattern is successfully obtained. It should be understood that a manner of sampling the second image is not limited to the foregoing manner, and another common sampling manner and a sampling manner that can be obtained by a person skilled in the art without creative efforts are also possible.

Figure 4B:
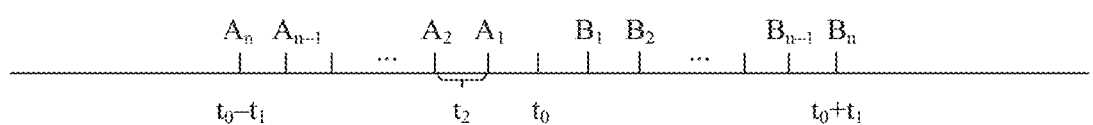
FIG. 4B shows another implementation of parsing a target encoding pattern based on a second image according to an embodiment of the present invention.

Refer to FIG. 4B. In another implementation, a second preset time period $t_2$ is a time interval, and an image that is collected by the vehicle-mounted camera and whose time interval with that of a first image is within a first preset time period is sampled. In other words, sampling is performed on second images collected by the vehicle-mounted camera between a moment $t_0-t_1$ and a moment $t_0+t_1$, to obtain a plurality of second images ($A_1$, $A_2$, $A_{n-1}$, $A_n$, $B_1$, $B_2$, $B_{n-1}$, $B_n$, and the like) at the same time. The plurality of second images obtained through sampling, are sorted, and target encoding patterns in the second images are sequentially parsed based on a sorting order. Each second image may be parsed sequentially based on a sorting sequence, or when an operation condition permits, the plurality of second images may be parsed simultaneously. Parsing of the target encoding patterns is stopped once parsing information in the target encoding pattern is obtained. When the plurality of second images obtained through sampling are sorted, indicators related to an imaging effect and a parsing difficulty may be used as a sorting rule. For example, the plurality of second images are sorted based on evaluation indicators such as exposure and definition. It should be understood that a sorting method is not limited in this method embodiment, and another common sorting indicator in this field is also possible.

After the parsing information in the target encoding pattern is successfully obtained, a corresponding operation may be performed according to indications in the parsing information. The indications in the parsing information may include any operation that may be performed by a vehicle-mounted control system. For example, the operations may include: performing a payment operation by scanning a code, performing vehicle identity authentication, registering vehicle information in a given system, and downloading a given in-vehicle application. Other operations are also possible.

Figure 5:
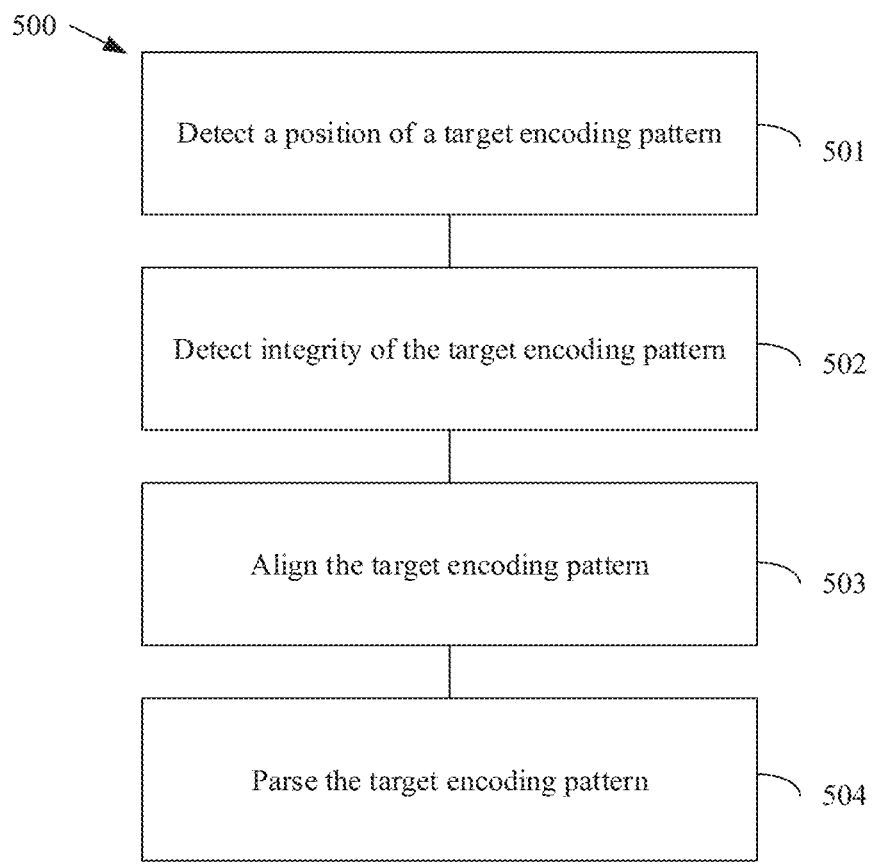
FIG. 5 shows a method for parsing a target encoding pattern in an image obtained by a vehicle-mounted camera according to an embodiment of the present invention.

Refer to FIG. 5. In an embodiment of the present invention, a method 500 for parsing information in a target encoding pattern by using an image that is collected by a vehicle-mounted camera and includes the target encoding pattern is provided. The method may include the following steps.

Step 501: Detect a position of the target encoding pattern.
Step 502: Detect integrity of the target encoding pattern.
Step 503: Align the target encoding pattern.
Step 504: Parse the target encoding pattern.

In step 501, the position of the target encoding pattern is detected. In an implementation, an algorithm used when the target encoding pattern is detected in step 102 may be reused for detecting the position of the target encoding pattern. In another implementation, similar target detection algorithms may also be retrained dedicated to detecting the position of the target encoding pattern. In addition, because a priori of the position of the target encoding pattern is already available when the target encoding pattern is detected in step 102, in another implementation, the position of the target encoding pattern may further be detected by using a simple algorithm such as a sliding window. It should be understood that another common algorithm in this field that can detect the position of the target encoding pattern is also possible. After detection of the position of the target encoding pattern is completed, a rectangular area including the target encoding pattern may be cut out for use in a subsequent step. The position of the target encoding pattern may be used to detect integrity of the target encoding pattern, or a step of detecting the position of the target encoding pattern may be skipped, and integrity of the target encoding pattern may be detected in another manner.

In step 502, integrity of the target encoding pattern is detected. In an implementation, the integrity of the target encoding pattern may be determined based on positioning icons. When all positioning icons on the target encoding pattern are detected, it is considered that the target encoding pattern is complete. For example, in the two-dimensional code pattern shown in FIG. 2A, three "back"-shaped icons located on the upper left, upper right, and lower left are positioning icons of the two-dimensional code. When the three complete "back"-shaped icons are detected, it may be considered that the two-dimensional code pattern is complete. In the two-dimensional bar code pattern shown in FIG. 2B, black boxes and lines located on the left and right are front and rear positioning icons of the two-dimensional bar code. Integrity of the front and rear positioning icons may be implemented by using an edge detection operator, for example, sobel. When it is detected that four edges and intersection points (vertexes of the positioning icons) of the front and rear positioning icons are inside the image, the two-dimensional bar code pattern may be considered to be complete. In the one-dimensional bar code pattern shown in FIG. 2C, some vertical lines on the left and right are front and rear positioning icons. When all positioning icons are detected horizontally, it may be considered that the one-dimensional bar code pattern is complete (the one-dimensional bar code does not need to detect longitudinal integrity). In another implementation, integrity of the target encoding pattern may be further determined based on a position of the target encoding pattern. For example, when the target encoding pattern is located at an edge of the image, it is considered that the target encoding pattern is incomplete. When there is no intersection point between a boundary of the target encoding pattern and the edge of the image, it is considered that the target encoding pattern is complete. It should be understood that another common method in this field that can detect integrity of the target encoding pattern is also possible.

In the conventional technology, parsing information cannot be obtained by parsing an incomplete target encoding pattern. Therefore, if it is detected that the target encoding pattern is incomplete, the image is discarded, and a next image that includes the target encoding pattern is directly parsed.

Due to a shooting angle and an imaging angle of the vehicle-mounted camera, an image photographed by the vehicle-mounted camera usually has a perspective effect or a projection effect. Therefore, an alignment operation may be performed on the target encoding pattern in step 503 to improve a parsing success rate of the target encoding pattern. In an implementation, alignment may be performed on the target encoding pattern based on the positioning icon. To be specific, a position of the positioning icon in the target encoding pattern is first identified, and then the positioning icon is transformed to a specific position by using affine transformation. Thus, a target encoding pattern that is straight, is centered, and has a proper size is obtained. When the target encoding pattern is aligned, algorithms such as training a deep neural network, a support vector machine, and a template matching may be used by collecting and labeling samples that include a position and a size of a positioning icon. A trained algorithm can detect a position and a size of the positioning icon, so that alignment of the target encoding pattern is implemented. It should be understood that another common method in this field that can implement alignment of the target encoding pattern is also possible.

A target encoding pattern with a serious perspective or projection effect may fail to obtain parsing information through parsing. Therefore, in step 502, if the perspective or projection effect of the target encoding pattern is serious and alignment cannot be implemented, the image is discarded, and a next image that includes the target encoding pattern is directly parsed.

In step 504, the complete and aligned target encoding pattern is parsed. For the complete and aligned target encoding pattern, a common algorithm in this field, for example, a global binarization algorithm or a hybrid binarization algorithm, may be used to convert black and white small grids in the target encoding pattern into binary numbers, and then decode the binary numbers into character information. The character information may be a link to an object, or the like. If the target encoding pattern is successfully parsed, a corresponding indication in the parsing information is obtained. If the target encoding pattern fails to be parsed, that is, no parsing information in the target encoding pattern is successfully obtained, a parsing failure state is returned.

In some embodiments, when no parsing information in the target encoding pattern is successfully obtained by using the second image, the state of the vehicle may be properly changed, and the target encoding pattern is parsed by using a third image collected by the vehicle-mounted camera after the vehicle status changes. A purpose of changing the vehicle status is to adaptively adjust a possible vehicle status, so that the vehicle-mounted camera obtains a better collection effect. For example, adaptive adjustment may be performed on a position, a speed, or an orientation of a vehicle, a shooting angle of the vehicle-mounted camera, and the like. Specifically, when the vehicle speed is excessively fast, resulting in low definition of imaging of the target encoding pattern, the vehicle speed may be appropriately reduced. When the distance between the vehicle and the target encoding pattern is excessively small, resulting in an incomplete collected target encoding pattern, the distance between the vehicle and the target encoding pattern may be appropriately increased. When the orientation of the vehicle and/or the shooting angle of the vehicle-mounted camera cause serious distortion of the collected target encoding pattern, the orientation of the vehicle and/or the shooting angle of the vehicle-mounted camera may be adjusted to a direction beneficial to image collection. When the vehicle status is adjusted, the foregoing plurality of aspects may be adjusted at the same time, or only one aspect may be adjusted at a time. When no parsing information is still obtained by parsing the target encoding pattern in the image obtained by the vehicle-mounted camera after the aspect is adjusted, another aspect is adjusted. It should be understood that other adaptive adjustments to the vehicle status are also possible in order to obtain a better collection effect.

In an implementation, a driver may be prompted to manually adjust the vehicle status, to obtain a better collection effect. In another implementation, if the vehicle has a specific self-driving function, the vehicle may be further controlled to automatically complete the foregoing adjustment through the self-driving function when there is no safety risk.

In a process of parsing the target encoding pattern by using the third image obtained by the vehicle-mounted camera, before the parsing information is successfully obtained, a vehicle status may need to be continuously changed, and then a third image is continuously obtained for parsing. This process may last for a long time and cause some interference to normal running of the vehicle. Even in some extreme cases, the target encoding pattern in the third image cannot be successfully parsed regardless of whether the vehicle status is adjusted. Therefore, in an implementation, a time period or a quantity of times of parsing the target encoding pattern in the third image collected by the vehicle-mounted camera may be limited. For example, a specific threshold is set. When the time period or the quantity of times of parsing the target encoding pattern in the third image collected by the vehicle-mounted camera reaches the specified threshold, a failure is directly returned. In this case, the driver may be prompted to perform an interactive operation in another manner, to improve efficiency.

In some embodiments, a security authentication step may be added before the corresponding operation is performed according to the instruction in the parsing information, to improve security and prevent a malicious attack. In an implementation, some interaction manners that have little interference to a driving operation and have simple operations may be used, and a willingness to perform a corresponding operation is confirmed by interaction with the driver or another person in the vehicle. For example, a willingness to perform a corresponding operation may be confirmed by using a voice response, a head unit operation, a gesture response, a head posture response, or the like. It should be understood that another common human-computer interaction manner in this field is also possible. In another implementation, to further improve security, identity authentication may be added to security authentication in some high-risk operations. An identity of an operator can be verified by verifying some specific human features. For example, an identity of an operator is verified by using methods such as face recognition, iris recognition, fingerprint recognition, and voice recognition. It should be understood that another common method in this field that can verify the identity of the operator is also possible.

Figure 6A:
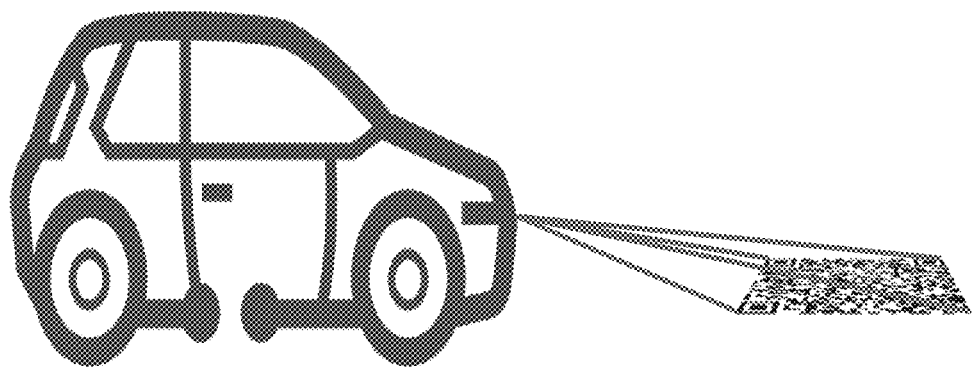
FIG. 6A is a schematic diagram of collecting, by a vehicle-mounted camera, an image including a target encoding pattern according to an embodiment of the present invention.
Figure 6B:
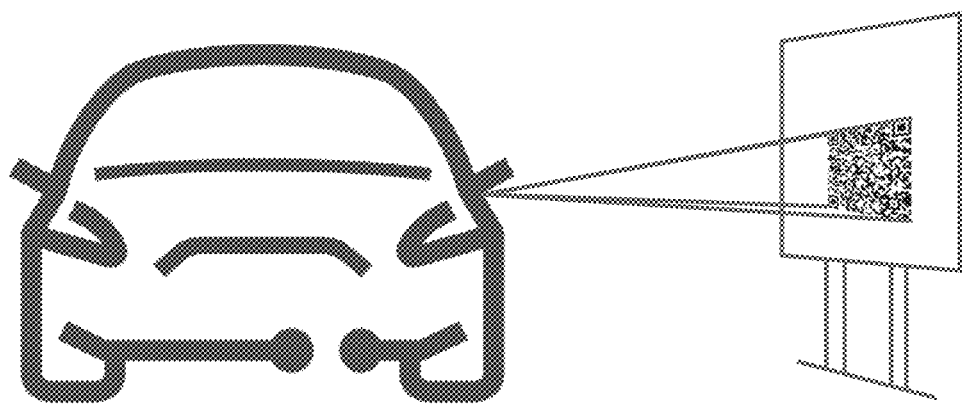
FIG. 6B is a schematic diagram of collecting, by a vehicle-mounted camera, an image including a target encoding pattern according to an embodiment of the present invention.

When arranging the target encoding pattern, a party providing the target encoding pattern should consider factors such as a position, an orientation, and an angle of view of the vehicle-mounted camera, and select a position that can be completely and clearly identified to arrange the target encoding pattern. In a code scanning process, there is such a position, when the vehicle passes through the position at the latest, the target encoding pattern is collected and parsed, and the position is called a code scanning position. Refer to FIG. 6A. In some implementations, the target encoding pattern may be sprayed on the ground in front of the code scanning position, and an image that is in front of the vehicle and that includes the target encoding pattern may be collected by using the vehicle-mounted camera located in the front of the vehicle. The target encoding pattern sprayed on the ground should have a proper size to obtain better collection effect. In general, a length and width of the target encoding pattern sprayed on the ground should be greater than 60 cm. Refer to FIG. 6B. In some other implementations, the target encoding pattern may be sprayed or posted on signage near the code scanning position. The signage may be independent signage, or may be signage shared with other information. An image including the target encoding pattern located on the signage may be obtained by the vehicle-mounted camera located on left and right sides of the vehicle. The target encoding pattern sprayed or posted on the signage should also have a proper size to obtain better collection effect. In general, a length and width of the target encoding pattern sprayed or posted on the signage should be greater than 40 cm.

Figure 7A:
FIG. 7A to FIG. 7D are schematic diagrams of target encoding patterns having geometric features according to an embodiment of the present invention.
Figure 7B:
Figure 7C:
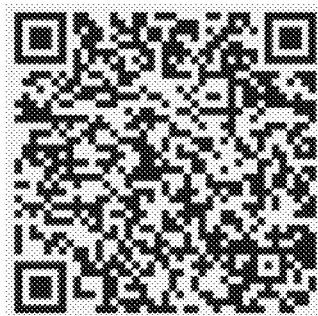
Figure 7D:
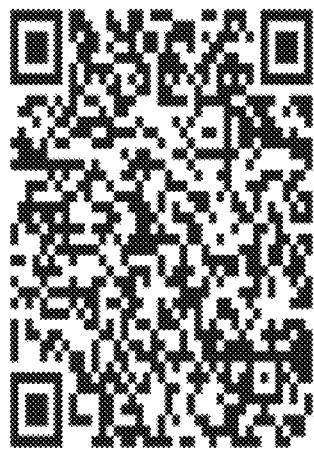

In some embodiments, some geometric features may be added to the target encoding pattern, so that the target encoding pattern can be distinguished from another encoding pattern. The geometric feature may include any feature that enables the target encoding pattern to be distinguished from other encoding patterns, for example, a border, a shading, a background color, and an aspect ratio. FIG. 7A shows a target encoding pattern to which a border is added, FIG. 7B shows a target encoding pattern to which shading is added, FIG. 7C shows a target encoding pattern to which a background color is added, and FIG. 7D shows a target encoding pattern to which an aspect ratio is changed. It should be understood that another common geometric feature in this field that can distinguish the target encoding pattern from other encoding patterns is also possible. The foregoing specific geometric feature is added to training data of the algorithm used for detecting the target encoding pattern, so that the trained target detection algorithm can identify only the target encoding pattern including the specific geometric feature. This avoids interference of another encoding pattern.

In step 101, the vehicle-mounted camera dedicated to the code scanning operation may be turned on when the vehicle-mounted control system is turned on, or may be turned on by setting a specific trigger condition. When the dedicated vehicle-mounted camera is used to perform the code scanning operation, a function of detecting whether the image obtained by the vehicle-mounted camera includes the target encoding pattern may be enabled simultaneously with a collection function of the vehicle-mounted camera. When a vehicle-mounted camera that performs another function is reused to perform the code scanning operation, the function of detecting whether the image obtained by the vehicle-mounted camera includes the target encoding pattern may be enabled when the collecting function of the vehicle-mounted camera is enabled, to collect the target encoding pattern in real time. On a premise that the collecting function of the vehicle-mounted camera is enabled, a specific trigger condition may be set to enable the detection function of the target encoding pattern. For example, the operator operates a head unit, makes a specific gesture, gives a voice command, and the like. It is considered that a driving-related code scanning scenario is usually performed in a parking or low-speed driving condition, in another implementation, a speed threshold may be set, and when a driving speed of the vehicle is lower than the threshold, the detection function for the target encoding pattern is triggered. In another implementation, a position on which code scanning may need to be performed, for example, a gas station, a toll station, or a charging pile, may be preset on a map in a triggering manner based on geographical location information, and the detection function of the target encoding pattern is triggered when the vehicle arrives at the preset position. In another implementation, a network-based triggering manner may also be used. A party that provides the target encoding pattern delivers a code scanning instruction through a network, to trigger the detection function of the target encoding pattern. It should be understood that another common triggering manner that can be obtained by a person skilled in the art without creative efforts is also possible.

Figure 8:
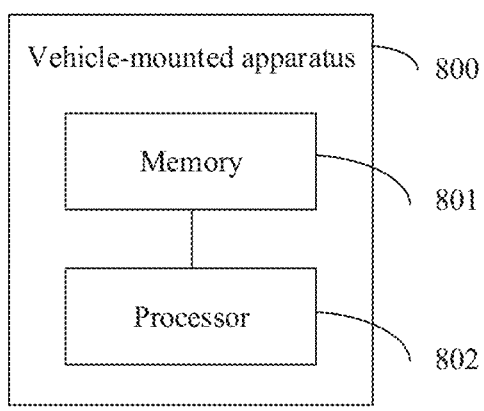
FIG. 8 is a schematic diagram of a structure of a vehicle-mounted apparatus according to an embodiment of the present invention.

Based on a same technical concept as the foregoing embodiment, referring to FIG. 8, in an embodiment of the present invention, a vehicle-mounted apparatus 800 is provided. Specifically, the vehicle-mounted apparatus 800 includes a memory 801 and a processor 802. (There may be one or more processors 802 in the vehicle-mounted apparatus 800, and one processor is used as an example in FIG. 8). The memory 801 may include a read-only memory and a random access memory, and provide instructions and data for the processor 802.

A part of the memory 801 may further include a non-volatile random access memory (non-volatile random access memory, NVRAM). The memory 801 stores a processor and operation instructions, an executable module or a data structure, a subnet thereof, or an expanded set thereof. The operation instructions may include various operation instructions to implement various operations.

The method disclosed in embodiments of this application may be applied to the processor 802, or may be implemented by the processor 802. The processor 802 may be an integrated circuit chip and has a signal processing capability. In an implementation process, the steps in the foregoing methods may be implemented by using a hardware integrated logic circuit in the processor 802, or by using instructions in a form of software. The processor 802 may be a general-purpose processor, a digital signal processor (digital signal processor, DSP), a microprocessor, or a microcontroller. The processor 802 may further include an application-specific integrated circuit (application-specific integrated circuit, ASIC), a field-programmable gate array (field-programmable gate array, FPGA) or another programmable logic device, a discrete gate, or a transistor logic device, or a discrete hardware component. The processor 802 may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished through a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 801, and the processor 802 reads information in the memory 801 and completes the steps in the foregoing methods in combination with hardware of the processor.

The vehicle-mounted apparatus 800 may be installed in the vehicle in any form. In some implementations, the vehicle-mounted apparatus 800 may be a front-mounted vehicle-mounted product, and is, for example, installed by a machine vendor before delivery. In other embodiments, the vehicle-mounted apparatus 800 may be a rear-mounted vehicle-mounted product, for example, installed by a channel such as a 4S store after delivery.

In addition, in some implementations, the vehicle-mounted apparatus 800 may be integrated inside the vehicle-mounted camera to form a smart camera. The vehicle-mounted camera completes image collection and the foregoing code scanning method, and transfers, to a central control unit, parsing information obtained by parsing the target encoding pattern. The central control system completes subsequent operations such as displaying the parsing information and user operations.

In some implementations, the vehicle-mounted apparatus 800 may be integrated into a central control system of the vehicle. The central control system obtains an image collected by the vehicle-mounted camera, performs the foregoing code scanning operation, and completes the subsequent operations such as displaying the parsing information and the user operations.

It should be noted that for specific implementations and beneficial effects of performing, by the processor 802, the steps and processes described in the method embodiments shown in FIG. 1 to FIG. 7, refer to descriptions in the method embodiments corresponding to FIG. 1 to FIG. 7. Details are not described herein again.

Figure 9:
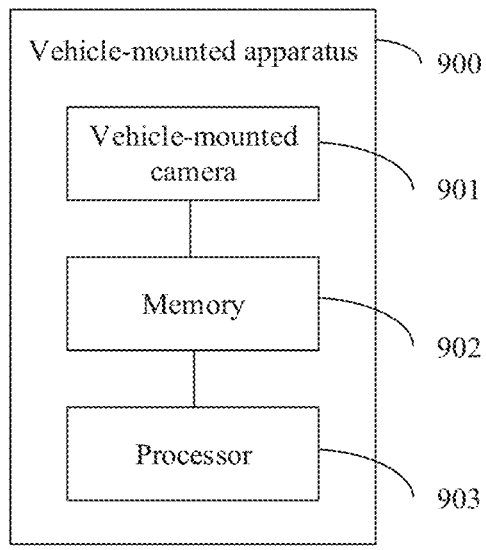
FIG. 9 is a schematic diagram of a structure of another vehicle-mounted apparatus according to an embodiment of the present invention.

Based on a same technical concept as the foregoing embodiment, referring to FIG. 9, in another embodiment of the present invention, another vehicle-mounted apparatus 900 is provided. Specifically, the vehicle-mounted apparatus 900 includes: a vehicle-mounted camera 901, a memory 902, and a processor 903.

In an implementation, the vehicle-mounted camera configured to collect an image may reuse an existing camera that performs another function at a proper position. For example, cameras on two sides of the vehicle may be used to collect images on the two sides of the vehicle, and a camera in the front of the vehicle may be used to collect an image in front of the vehicle. The reused vehicle-mounted camera may determine an enabling moment of a collection function based on an original function, provided that it is ensured that the vehicle-mounted camera is in an enabled state when a code scanning operation needs to be performed. This is not limited in this embodiment of the present invention. For example, the collection function of the vehicle-mounted camera may be automatically enabled after a vehicle control system is enabled, or may be enabled after driver authorization. In another implementation, a dedicated camera dedicated to the code scanning operation of the vehicle may also be installed at a proper position. The collecting function of the dedicated camera can be automatically enabled after the vehicle control system is turned on, or can be enabled by some trigger conditions when a code scanning operation needs to be performed.

For example, the operator operates a head unit, makes a specific gesture, gives a voice command, and the like. It is considered that a driving-related code scanning scenario is usually performed in a parking or low-speed driving condition, in another implementation, a speed threshold may be set, and when a driving speed of the vehicle is lower than the threshold, the detection function for the target encoding pattern is triggered. In another implementation, a position on which code scanning may need to be performed, for example, a gas station, a toll station, or a charging pile, may be preset on a map in a triggering manner based on geographical location information, and the detection function of the target encoding pattern is triggered when the vehicle arrives at the preset position. In another implementation, a network-based triggering manner may also be used. A party that provides the target encoding pattern delivers a code scanning instruction through a network, to trigger the detection function of the target encoding pattern. It should be understood that another common triggering manner that can be obtained by a person skilled in the art without creative efforts is also possible.

Specific implementations of the memory 902 and the processor 903 are provided in descriptions of the vehicle-mounted apparatus 800. Details are not described herein again.

The vehicle-mounted apparatus 900 is integrated with a vehicle-mounted camera, a memory, and a processor, and can be used as a smart camera to complete image collection and code scanning operations, and transmit parsing information obtained by parsing the target encoding pattern to a central control unit. The central control system completes subsequent operations such as displaying the parsing information and user operations.

Figure 10:
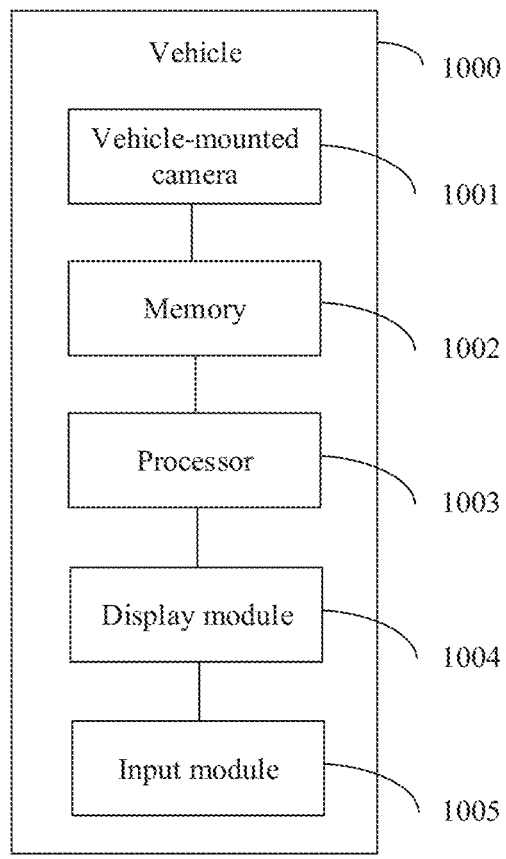
FIG. 10 is a schematic diagram of a structure of a vehicle according to an embodiment of the present invention.

Based on a same technical concept as the foregoing embodiment, referring to FIG. 10, in another embodiment of the present invention, a vehicle 1000 is provided, and the vehicle 1000 specifically includes the following modules:
- a vehicle-mounted camera 1001, configured to collect an image, where usage of the vehicle-mounted camera and a trigger condition are provided in descriptions of the vehicle-mounted apparatus 900, and details are not described herein again;
- a memory 1002 and a processor 1003, where specific implementations of the memory 902 and the processor 903 are provided in descriptions of the vehicle-mounted apparatus 800, and details are not described herein again;
- a display module 1004, configured to display parsing information obtained by parsing a target encoding pattern; and
- an input module 1005, configured to receive an input of an operator, and further determine an operation to be performed on the parsing information.

The display module 1004 includes any apparatus that can implement a display function in a vehicle cockpit, for example, a head unit screen, a head-up display system, and a rear-row screen. It should be understood that another common display apparatus in the cockpit is also possible. The display module 1004 displays the parsing information obtained by parsing the target encoding pattern, and transmits the information to a driver and/or a passenger.

The input module 1005 includes any apparatus that can implement a human-computer interaction function in the vehicle cockpit, for example, a touchscreen, a voice receiving system, a camera, or another sensor. Through human-computer interaction, an instruction that is of a user and that indicates a specific operation is to be performed in the parsing information is received. For example, the instruction may be conveyed in a manner of a voice response, a head unit operation, a gesture response, a head posture response, or the like. It should be understood that another common human-computer interaction mode and apparatus for implementing a human-computer interaction function in the vehicle cockpit are also possible.

The vehicle 1000 collects an image by using the vehicle-mounted camera 1001, to obtain an image that includes a photographed target encoding pattern; implements the foregoing code scanning method by using the memory 1002 and the processor 1003, and obtains the parsing information by parsing the target encoding pattern in the image collected by the vehicle-mounted camera 1001; displays, by using the display module, content or an interface corresponding to the parsing information for the operator; and obtains operations performed by the operator on the content or the interface corresponding to the parsing information by using the input module, to complete processing of the parsing information. The vehicle 1000 can implement all procedures of collection, parsing, and processing in a centralized manner.

An embodiment of the present invention further provides a computer-readable storage medium. Based on the description of the foregoing implementations, a person skilled in the art may clearly understand that this application may be implemented by software in addition to necessary universal hardware, or certainly may be implemented by dedicated hardware, including an application-specific integrated circuit, a dedicated CLU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application. When the computer program instruction corresponding to the code scanning method in the storage medium is read or executed by the electronic device, the steps and processes described in the method embodiments shown in FIG. 1 to FIG. 7 may be implemented. Details are not described herein again.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk, SSD)), or the like.

It may be understood that, in the several embodiments provided in this application, the disclosed method, the vehicle-mounted apparatus, the vehicle, and the computer-readable storage medium may be implemented in other manners. For example, the described apparatus embodiment is merely an example, and there may be a plurality implementations during specific implementation.

It may be understood that a sequence of the steps of the method in embodiments of the present invention may be adjusted, and some steps may be combined or deleted based on an actual requirement. Correspondingly, functions implemented by the program instructions in the memory in the control apparatus in this embodiment of the present invention may also be adjusted, combined, and deleted in a sequence according to an actual requirement.

The foregoing disclosures are merely embodiments of the present invention, and certainly are not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A method, comprising:
    obtaining a first image collected by a vehicle-mounted camera, wherein the first image comprises a target encoding pattern photographed by the vehicle-mounted camera;
    parsing the target encoding pattern by using the first image; and
    in response to determining that no parsing information is obtained by parsing the target encoding pattern, parsing the target encoding pattern by using a second image, wherein the second image is an image already collected by the vehicle-mounted camera, wherein the second image comprises the target encoding pattern photographed by the vehicle-mounted camera, and an interval between a collection moment of the second image and a collection moment of the first image is within a first preset time period.

2. The method according to claim 1, wherein after parsing information is obtained by parsing the target encoding pattern in the second image, a corresponding operation is performed according to an indication in the parsing information.

3. The method according to claim 1, wherein in response to determining that no parsing information is obtained by parsing the target encoding pattern in the second image, the method further comprises:
    parsing the target encoding pattern by using a third image, wherein the third image comprises the target encoding pattern photographed by the vehicle-mounted camera, and wherein the third image is an image collected by the vehicle-mounted camera after changing a vehicle status.

4. The method according to claim 3, wherein changing the vehicle status comprises prompting a driver to adjust the vehicle status or automatically adjusting the vehicle status by the vehicle.

5. The method according to claim 1, wherein the parsing the target encoding pattern comprises:
    detecting integrity of the target encoding pattern;
    aligning the target encoding pattern when it is detected that the target encoding pattern is complete; and
    parsing the target encoding pattern.

6. The method according to claim 1, wherein the parsing the target encoding pattern by using a second image comprises:
    performing sampling on image data based on a second preset time interval to obtain one second image, wherein an interval between a moment at which the image data is collected and the moment at which the vehicle-mounted camera collects the first image is within the first preset time period;
    parsing the target encoding pattern by using the second image; and
    in response to determining that parsing information is not obtained by parsing the target encoding pattern in the second image, performing next sampling on the image data based on the second preset time interval.

7. The method according to claim 1, wherein the parsing the target encoding pattern by using a second image comprises:
    performing sampling on image data based on a second preset time interval to obtain a plurality of second images, wherein an interval between a moment at which the image data is collected and the moment at which the vehicle-mounted camera collects the first image is within the first preset time period;
    sorting the plurality of second images based on exposure or definition;
    parsing the target encoding pattern in the second images according to a sorting order; and
    stopping parsing the target encoding pattern when the parsing information is obtained.

8. The method according to claim 1, wherein the obtaining a first image collected by a vehicle-mounted camera comprises obtaining, when a trigger condition is met, the first image collected by the vehicle-mounted camera.

9. The method according to claim 8, wherein the trigger condition comprises one or more of the following: an instruction of an operator is received, a vehicle speed is lower than a threshold, a geographical location is reached, and an instruction sent through a network is received.

10. The method according to claim 1, wherein the target encoding pattern comprises a two-dimensional code or a one-dimensional bar code.

11. The method according to claim 1, wherein the first image comprises an encoding pattern having a geometric feature, and the geometric feature is a feature that distinguishes the target encoding pattern from another encoding pattern.

12. The method according to claim 11, wherein the geometric feature comprises one or more of a border, a shading, a background color, and an aspect ratio.

13. The method according to claim 1, wherein the first preset time period becomes smaller as the vehicle speed increases.

14. A vehicle-mounted apparatus, comprising:
at least one processor and a memory, wherein the at least one processor is coupled to the memory, and the memory stores program instructions for execution by the at least one processor to perform operations comprising:
- obtaining a first image collected by a vehicle-mounted camera, wherein the first image comprises a target encoding pattern photographed by the vehicle-mounted camera;
- parsing the target encoding pattern by using the first image; and
- in response to determining that no parsing information is obtained by parsing the target encoding pattern, parsing the target encoding pattern by using a second image, wherein the second image is an image already collected by the vehicle-mounted camera, and an interval between a collection moment of the second image and a collection moment of the first image is within a first preset time period.

15. The vehicle-mounted apparatus according to claim 14, wherein after parsing information is obtained by parsing the target encoding pattern in the second image, a corresponding operation is performed according to an indication in the parsing information.

16. The vehicle-mounted apparatus according to claim 14, wherein in response to determining that no parsing information is obtained by parsing the target encoding pattern in the second image, the operations further comprise:
- parsing the target encoding pattern by using a third image, wherein the third image comprises the target encoding pattern photographed by the vehicle-mounted camera, and wherein the third image is an image collected by the vehicle-mounted camera after changing a vehicle status.

17. The vehicle-mounted apparatus according to claim 16, wherein changing the vehicle status comprises prompting a driver to adjust the vehicle status or automatically adjusting the vehicle status by the vehicle.

18. The vehicle-mounted apparatus according to claim 14, wherein the parsing the target encoding pattern comprises:
- detecting integrity of the target encoding pattern;
- aligning the target encoding pattern when it is detected that the target encoding pattern is complete; and
- parsing the target encoding pattern.

19. The vehicle-mounted apparatus according to claim 14, wherein the parsing the target encoding pattern by using a second image comprises:
- performing sampling on image data based on a second preset time interval to obtain one second image, wherein an interval between a moment at which the image data is collected and the moment at which the vehicle-mounted camera collects the first image is within the first preset time period;
- parsing the target encoding pattern by using the second image; and
- in response to determining that parsing information is not obtained by parsing the target encoding pattern in the second image, performing next sampling on the image data based on the second preset time interval.

20. The vehicle-mounted apparatus according to claim 14, wherein the parsing the target encoding pattern by using a second image comprises:
- performing sampling on image data based on a second preset time interval to obtain a plurality of second images, wherein an interval between a moment at which the image data is collected and the moment at which the vehicle-mounted camera collects the first image is within the first preset time period;
- sorting the plurality of second images based on exposure or definition;
- parsing the target encoding pattern in the second images according to a sorting order; and
- stopping parsing the target encoding pattern when the parsing information is obtained.

21. The vehicle-mounted apparatus according to claim 14, wherein the obtaining a first image collected by a vehicle-mounted camera comprises obtaining, when a trigger condition is met, the first image collected by the vehicle-mounted camera.

22. The vehicle-mounted apparatus according to claim 21, wherein the trigger condition comprises one or more of the following: an instruction of an operator is received, a vehicle speed is lower than a threshold, a geographical location is reached, and an instruction sent through a network is received.

23. The vehicle-mounted apparatus according to claim 14, wherein the target encoding pattern comprises a two-dimensional code and a one-dimensional bar code.

24. The vehicle-mounted apparatus according to claim 14, wherein the first image comprises an encoding pattern having a geometric feature, and the geometric feature is a feature that distinguishes the target encoding pattern from another encoding pattern.

25. The vehicle-mounted apparatus according to claim 24, wherein the geometric feature comprises one or more of a border, a shading, a background color, and an aspect ratio.

26. A vehicle, comprising:
- a vehicle-mounted camera, the vehicle-mounted camera configured to collect an image;
- a display, the display configured to display content corresponding to parsing information obtained by parsing a target encoding pattern;
- an input device, the input device configured to receive an input of an operator; and
- at least one processor and at least one memory, wherein the at least one processor is coupled to the at least one memory, and the at least one memory stores program instructions for execution by the at least one processor to perform operations comprising:
  - obtaining a first image collected by a vehicle-mounted camera, wherein the first image comprises a target encoding pattern photographed by the vehicle-mounted camera;
  - parsing the target encoding pattern by using the first image; and
  - in response to determining that no parsing information is obtained by parsing the target encoding pattern, parsing the target encoding pattern by using a second image, wherein the second image is an image already collected by the vehicle-mounted camera, and an interval between a collection moment of the second image and a collection moment of the first image is within a first preset time period.

27. A non-transitory computer-readable storage medium, comprising a program, wherein when the program is run on a computer, the computer is enabled to perform operations comprising:
- obtaining a first image collected by a vehicle-mounted camera, wherein the first image comprises a target encoding pattern photographed by the vehicle-mounted camera;
- parsing the target encoding pattern by using the first image; and in response to determining that no parsing information is obtained by parsing the target encoding pattern, parsing the target encoding pattern by using a second image, wherein the second image is an image collected by the vehicle-mounted camera, and an interval between a collection moment of the second image and a collection moment of the first image is within a first preset time period.

\* \* \* \* \*